United States Patent Office 3,027,351
Patented Mar. 27, 1962

3,027,351
STABILIZING RUBBER WITH AN ACIDIC ANTIOXIDANT
Joy G. Lichty, Stow, Ohio, assignor to The Goodyear Tire & Rubber Company, Akron, Ohio, a corporation of Ohio
No Drawing. Filed Nov. 20, 1958, Ser. No. 775,111
15 Claims. (Cl. 260—45.85)

This invention relates to methods for incorporating antioxidants into unvulcanized rubbers and is more particularly concerned with adding organic acids alone or combined with amine or phenolic antioxidants to unvulcanized rubbers.

The protection of unvulcanized synthetic rubbers has long been a problem in the rubber industry because there are no natural antioxidants in synthesized rubbers. Unless some antioxidant is added to the rubbers, they oxidize during drying and mixing causing extensive degradation of the physical properties of the rubber and may even catch on fire from auto-oxidation if no antioxidant is present to protect the polymers.

It is an object of this invention to provide a process for protecting unvulcanized rubbers. It is another object of this invention to provide a method for incorporating organic acids into raw polymers. It is a further object of this invention to provide a method for incorporating organic acids combined with an amine or a phenolic antioxidant into raw polymers.

In the practice of this invention, unvulcanized rubbers are protected by one or more organic acids which are added in an antioxidant amount to the raw rubbers prior to vulcanization. The organic acid antioxidants may be added to the raw polymers by spraying a solvent solution of an organic acid onto dewatered crumbs of rubber, by dipping the dewatered crumbs of rubber into a solution of an organic acid, by milling an organic acid into crumbs of dewatered synthetic rubber prior to drying, by adding a solvent solution of an organic acid or an alkali metal salt of an organic acid to a synthetic rubber polymerization system or by adding a solution of an organic acid or an alkali salt of an organic acid to uncoagulated synthetic rubber latex. In the instances where an alkali metal salt of an organic acid is added to the polymerization system or the uncoagulated latex, the salt is converted to the free organic acid by the acid composition used to bring about coagulation. Therefore, when the salt is used, the material which affords protection against oxidation is the organic acid rather than the salt.

Preferably, one or more organic acids or alkali metal salts of an organic acid may be mixed with a synthetic rubber latex prior to coagulation of the rubber. The organic acid or salt is dissolved in a customary water miscible solvent such as water, ethanol, isopropanol, methanol, acetone, methyl ethyl ketone, etc. The serum of the latex will tend to dilute the concentration of the acid or salt in the latex. Therefore, when the latex is coagulated and dewatered and dried, a portion of the antioxidant is removed with the serum. However, a substantial portion remains with the rubber. If desired, the portion which is removed with the serum may be recovered and re-used by means of any of the well-known customary methods. Since some dilution of the acid or salt is inevitable, it is preferred to add the acid or salt to the rubber latex in a substantially concentrated form. This is accomplished by adding the acid or salt in the minimum amount of solvent necessary to dissolve it. However, more dilute solvent systems may be used. Acid concentration as low as 0.05% by weight, based on the weight of the rubber, has proved to be effective in protecting the raw polymers. Concentrations as high as 5.0% by weight, based on the weight of the rubber, may also be desired. The residual acid antioxant concentration will depend on the concentration of the acid or salt when added to the latex, the concentration of the latex, etc.

The acids or salts may also be added to the aqueous emulsion containing the monomers which are to be polymerized into the synthetic rubber. In this method also, the acid or salt is added with the minimum amount of solvent in which it can be dissolved. Thereafter, polymerization is effected by means of catalysts, etc. The formed polymers are coagulated by means of an acidic composition which simultaneously converts the salt of the organic acid into the free acid in which form it serves to protect the rubber against oxidation. The coagulated polymers are customarily dewatered to a concentration of about 50% by weight of water and 50% by weight of rubber by passing the coagulated polymers through any well known dewatering device. Thereafter, the water content may be further reduced to 25% or less by passing the dewatered polymers through a squeezing device. After this, the polymers are dried by means of forced air heat under controlled conditions by passing the polymers through a customary drying apparatus. Sufficient antioxidant should be added in order to have a residual concentration of from 0.05% to 5.0% by weight based on the weight of the rubber.

The acids may also be added to unvulcanized synthetic rubber by spraying a solution of the organic acids onto partially dried coagulated polymers. The acids are dissolved in one of the solvents noted above. The concentration of the acid in the solvent will depent on the particular acid and may be as low as 0.5% because the solvent will be evaporated from the system during later processing of the raw polymers. When the acids are sprayed onto coagulated polymers, it is preferred that the water content of the latex be substantially removed in order to minimize loss of antioxidant when the coagulated polymers are dried. The acids may be added to the coagulated polymers after the water content has been reduced by filtration, e.g., to about 50% by weight or may be preferably added to the coagulated polymers after the water content has been further reduced to 25% or less by weight, e.g., after the polymers have been passed through the squeezing apparatus. Thereafter, the coagulated polymers containing the antioxidants may be dried in the customary manner for later processing into rubber products. Sufficient antioxidants should be added in order to have a residual antioxidant content of at least 0.05% by weight, based on the weight of the rubber and may be as high as 5.0% by weight, based on the weight of the rubber. Customarily, the residual antioxidant content will range from 0.2 to 2.0%, based on the weight of the rubber.

The organic acids may be added to dewatered crumbs of coagulated synthetic rubber by dipping the rubber crumbs into a solution of the organic acids. Customarily, the water content of the coagulated rubbers will be reduced to 25% by weight or less before dipping the rubber into the acid solution. The concentration of the acid will depend on the particular acid being used and the solvent being used. Any of the customary solvents may be used to fluidize the acids such as water-soluble solvents listed above. The concentration may be as low as 0.5% by weight of acid and will preferably be substantially higher, e.g. up to substantially concentrated solutions. The time required for effective dipping will depend on the amount of water in the coagulated polymers and the concentration of the acid. Customarily, the time will range from 1 to 15 minutes. The coagulated polymers should be held in the acid solution for a time sufficient to provide a residual antioxidant content of from 0.05% to 5.0% by weight, based on the weight of the rubber.

The organic acids may be milled into the dewatered crumbs prior to the drying operation on a customary mill or in a customary internal mixer. The acids may be used alone or dissolved in any of the customary solvents such as those listed above and also various ethers, alcohols, petroleum hydrocarbon solvents, etc. A concentration of from 0.05% to 5.0% by weight, based on the weight of the rubber, is added to the dewatered rubber crumbs prior to the mixing operation.

It has been discovered that many known organic acids are useful in the practice of this invention. Among these organic acids are compounds conforming to the following structure

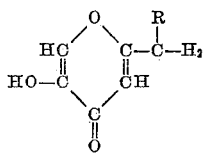

wherein R is selected from the group consisting of a hydroxyl radical, a halogen radical, and an acylated hydroxyl radical. Organic acids which conform to this structure are kojic, chlorokojic, kojyl palmitate, kojyl laurate, kojyl stearate, kojyl butyrate, kojyl caproate, kojyl caprylate, kojyl acetate, kojyl propionate, etc.

Other useful organic acids are compounds which conform to the following structure

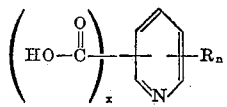

wherein R is selected from the group consisting of hydrogen, hydroxyl radicals and alkyl radicals having from 1 to 4 carbon atoms, $n$ is an integer ranging from 1 to 2, and $x$ is an integer ranging from 1 to 2. Organic acids which conform to this structure are nicotinic, isonicotinic, picolinic, isocinchomeronic, quinolinic, lutedinic, cinchomeronic, dipicolinic, dimeotinic, citrazinic, etc.

Additional organic acids which are useful are compounds which conform to the following structure

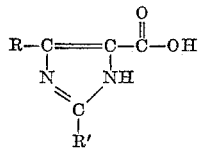

wherein R is selected from the group consisting of hydrogen, an alkyl radical having from 1 to 4 carbon atoms and a carboxyl radical, and R' is selected from the group consisting of hydrogen and alkyl radicals having from 1 to 4 carbon atoms. Organic acids which conform to this structure are 4.5 imidazole dicarboxylic, 2 ethyl (methyl, propyl and butyl) 4,5 imidazole dicarboxylic, 2,5 di (methyl, ethyl, propyl and butyl) 4 imidazole carboxylic acid, etc.

Other organic acids which are useful in the practice of this invention are compounds which conform to the following structure

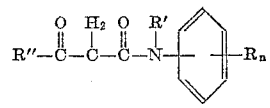

wherein R is selected from the group consisting of hydrogen, an alkyl radical containing from 1 to 9 carbon atoms, an aralkyl radical containing from 7 to 10 carbon atoms, cycloalkyl radicals containing from 6 to 9 carbon atoms and alkoxy radicals containing from 1 to 5 carbon atoms, R' is hydrogen or an alkyl radical containing from 1 to 4 carbon atoms, R'' is an alkyl radical containing from 1 to 4 carbon atoms and $n$ is an integer ranging from 1 to 3. The acidity of these compounds is due to their ability to exist in enolic forms. Organic acids which conform to this structure are acetoacetonilide, acetoacetotoluidide, acetoacetoxylidide, (butyl, amyl, benzyl, octyl and nonyl) acetoacetanilide, benzyl and substituted benzyl acetoacetanilide, cyclohexyl acetoacetanilide, methyl cyclohexyl and dimethyl cyclohexyl acetoacetanilide, acetoacetophenetidide, butoxy and propoxy acetoacetanilide, etc.

Additional organic acids which are useful in the practice of this invention are compounds which conform to the following structure:

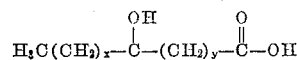

wherein $x$ is an integer ranging from 0 to 14 and $y$ is an integer ranging from 0 to 14. Organic acids which conform to this structure are hydroxybutyric acid, hydroxy stearic, hydroxy valeric, hydroxy caproic, hydroxy caprylic, hydroxy palmitic, hydroxy lauric, etc.

Also useful in the practice of this invention are thioacids selected from the group consisting of (1) thioacids conforming to the following structure

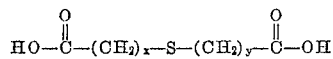

wherein $x$ is an integer ranging from 1 to 12 and $y$ is an integer ranging from 1 to 12, and (2) thioacids conforming to the following structure

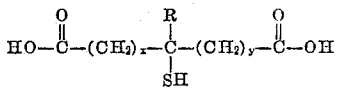

wherein R is selected from the group consisting of H and alkyl radicals containing from 1 to 4 carbon atoms, $x$ is an integer ranging from 0 to 12 and $y$ is an integer ranging from 0 to 12. Organic acids which conform to (1) are thiodipropionic acid, thiodiacetic acid, thiodibutyric acid, etc. Organic acids which conform to (2) are mercaptosuccinic, mercaptoadipic, mercaptoglutaric, mercaptoazelaic, mercaptopimelic, etc.

Compounds conforming to the following structure are also useful in the practice of this invention

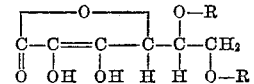

wherein R is selected from the group consisting of H, an alkyl radical containing from 1 to 4 carbon atoms and acetyl radicals. Organic acids which conform to this structure are ascorbic acid, isoascorbic acid, diacetylascorbic acid, dimethylascorbic acid, etc.

Also, compounds conforming to the following structure are useful in the practice of this invention

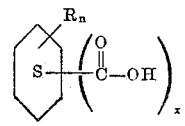

wherein R is selected from the group consisting of H and alkyl groups containing from 1 to 4 carbon atoms, $n$ is an integer ranging from 0 to 4 and $x$ is an integer ranging from 1 to 2. Organic acids which conform to this structure are cyclohexane dicarboxylic acid, methylcyclohexanedicarboxylic acid, dimethylcyclohexane dicarboxylic acid, cyclohexanecarboxylic acid, methylcyclohexanecarboxylic acid, dimethylcyclohexanecarboxylic acid, etc.

In addition, polycarboxylic acids such as tartaric, citric, itaconic, aconitic, malic, malonic, glutaric, oxalic, etc. are useful in the practice of this invention.

Thus the organic acids of this invention may be added to particular unvulcanized rubbers by adding the acids or alkali metal salts thereof to the uncoagulated latex, by spraying the acid onto dewatered crumbs of coagulated rubber, by dipping dewatered crumbs of coagulated rubber into solutions of the acids, by adding the acids in the form of their alkali metal salts to a solvent polymerization system, or by mixing the acids with the coagulated rubber. The organic acids and salts are added to unvulcanized rubbers in an amount of .05% to 5%, based on the weight of rubber.

The organic acid antioxidants of this invention may also be added to unvulcanized rubbers as synergists with known amine or phenolic antioxidants.

The amines which are useful as synergists with the organic acids are the known mono and di amines which are described in Rubber Chemicals by J. Van Alphen, Elsevier Publishing Co., 1956, pages 72–83.

Preferred amines are the diamines conforming to the following structural formula

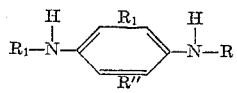

wherein R and $R_1$ may be hydrogen or the same or different primary or secondary alkyl radicals having from 1 to 20 carbon atoms, aralkyl radicals having from 7 to 12 carbon atoms, cycloalkyl radicals having from 5 to 8 carbon atoms, aryl radicals conforming to the following structure

wherein $R'''$ and $R''''$ are hydrogen or the same or different primary or secondary alkyl radicals having from 1 to 20 carbon atoms, aralkyl radicals having from 7 to 12 carbon atoms, cycloalkyl radicals having from 5 to 8 carbon atoms or alkoxy radicals having from 1 to 9 carbon atoms, and wherein $R'$ and $R''$ may be hydrogen or primary or secondary alkyl radicals containing from 1 to 20 carbon atoms.

Representative diamines which conform to the above definition are N,N'-diphenyl-p-phenylenediamine, N,N'-di($\alpha$-phenethyl)p-phenylenediamine, N,N'-di-secondary-p-phenylenediamine, N,N'-di-2-octyl-p-phenylenediamine, N,N'-di-3(5-methylheptyl)-p-phenylenediamine, N-isopropyl-N'-phenyl-p-phenylenediamine, N-secondary-butyl-N'-phenyl-p-phenylenediamine, N-2-octyl-N'-phenyl-p-phenylenediamine, etc.

The phenols which may be used as synergists with the organic acids of this invention are known alkylated phenolic antioxidants described in Rubber Chemicals (ibid.), pages 66–71.

Useful alkylated phenols are aralkyl phenols conforming to the following structural formula

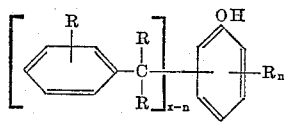

wherein R is selected from the group consisting of hydrogen and alkyl radicals having from 1 to 9 carbon atoms, $n$ is selected from the group consisting of 0, 1 and 2, and $x$ is selected from the group consisting of 1, 2 and 3, and wherein the value of $n$ is always at least 1 less than the value of $x$.

Examples of the aralkyl phenols described above are mono, di and tri alphaphenylethyl phenol; mono, di and tri alphatolylethyl phenol; mono, di and tri phenylmethyl phenol and the corresponding mono and di substituted cresols and xylenols, etc., including alkyl substitution on the phenolic ring containing up to 9 carbon atoms.

Other useful alkylated phenols are tertiary alkylated phenols conforming to the following structural formula

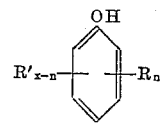

wherein $x$ is selected from the group consisting of 2 and 3 and $n$ is selected from the group consisting of 0, 1, 2 and 3, but not exceeding the value of $x$ and wherein R is selected from the group consisting of tertiary butyl and tertiary amyl radicals and R' is selected from the group consisting of tertiary octyl and tertiary nonyl radicals, R and R' being attached to the benzene ring in the 2, 4 and 6 positions.

Examples of the tertiary alkyl phenols described above are the various di and tri substituted tertiary butyl, amyl, octyl, and nonyl phenols wherein the phenol rings are substituted with at least two unlike groups and preferably are substituted with three tertiary alkyl substituents.

The range of proportions of the synergistic mixtures of acids and amines or phenols may range from 10 to 90% by weight of acid to from 90 to 10% by weight of amine or phenolic antioxidant. The customary antioxidant amounts of each are added to the unvulcanized synthetic rubbers such as 0.2 to 5.0% by weight based on the weight of the rubbers.

The practice of this invention is further illustrated by the following examples and tests but the invention is not limited thereto.

*Example 1*

Thirty-seven hundred milliliters of SBR latex (styrene-butadiene latex containing 1,000 grams of rubber) containing 1.25% by weight, based on the weight of the rubber, of Wingstay-T, a phenolic antioxidant comprised of a mixture of tertiary alkyl phenols, was coagulated by pouring the latex into 2,800 grams of a 10% sodium chloride solution and acidifying with a dilute sulfuric acid solution (containing 2 grams per liter of acid) to a pH of 4. The coagulated rubber was separated from the solution and washed with water. The wet crumb was then slurried in a 16.6% water solution of tartaric acid for a period of 1 minute. The rubber was removed from the acid solution and dried in a circulating air oven at a temperature of 70° C. for 12 hours. Analysis of the rubber showed a tartaric acid content of 4%.

*Example 2*

The latex described in Example 1 was coagulated by the procedure described in Example 1. The wet crumb was slurried for 1 minute in a 1.3% solution of tartaric acid and thereafter removed and dried. This rubber was found to contain 0.46% by weight of tartaric acid which was enough to effectively protect the raw polymers.

*Example 3*

A synthetic rubber latex similar to that described in Example 1 was coagulated as described in Example 1. The wet crumb was slurried for 15 minutes in a 0.5% solution of tartaric acid and thereafter separated from the solution and dried. Analysis showed that the dried rubber contained 0.33% by weight of tartaric acid which was effective to protect the rubber.

Example 4

Five tenths percent by weight of the potassium salt of tartaric acid was added to a commercial oil-extended SBR (styrene-butadiene) latex containing 1.25% by weight of Wingstay-T, a phenolic antioxidant comprised of a mixture of tertiary alkyl phenols. The rubber was coagulated from the latex by the procedure described in Example 1, dewatered and dried.

Example 5

An aqueous solution of potassium tartrate containing 0.5% by weight based on the weight of rubber to be formed was added to the polymerization system from which SBR latex was prepared in the customary manner. After stripping off the unreacted monomer, 1.25% by weight of Wingstay-T, a phenolic antioxidant comprised of a mixture of tertiary alkyl phenols, was added and the latex coagulated by the procedure described in Example 1. After drying, the tartaric acid content of the rubber was 0.28% which illustrates the unexpectedly small loss of acid, the remaining acid being sufficient to protect the polymers.

The invention may also be practiced using any of the organic acids disclosed herein. Also, the invention may be practiced with any of the synergistic mixtures of organic acids and phenolic or amine antioxidants. The effectiveness of the acids as antioxidants is illustrated by the following. Oxygen absorption tests were made according to American Society for Testing Materials special technical publication No. 89, pages 12–28, 1949, by J. R. Shelton, entitled Oxygen Absorption Methods. In this test, about 2 grams of SBR rubber, containing about 25% by weight of styrene and 75% by weight of butadiene were dissolved in about 100 cubic centimeters of benzene. To this solution either 1% by weight or 2% by weight, based on weight of the rubber, of the indicated antioxidant was added in an alcohol or benzene solution. This solution was poured onto an aluminum tray after which the solvents were allowed to evaporate, leaving a film of rubber about .03 inch thick. Thereafter, the trays containing the sheets of rubber were placed in a closed container filled with oxygen. The progress of the test was followed by noting the decrease in oxygen pressure.

Table 1 illustrates the practice of the invention wherein representative organic acids were used to protect the rubber.

TABLE I

| Acid (2 parts): | Hours to absorb 0.5% oxygen |
|---|---|
| None | 8 |
| Kojic | 500 |
| Kojyl palmitate | 100 |
| Isocinchomeronic | 87 |
| Imidazoledicarboxylic | 30 |
| Acetoacetanilide | 12 |
| β-Hydroxybutyric | 25 |
| Thiodipropionic | 110 |
| Thiomalic | 75 |
| Isoascorbic | 78 |
| Cyclohexyldicarboxylic | 104 |
| Tartaric | 70 |
| Malonic | 285 |
| Citric | 68 |
| Oxalic | 67 |
| Anthranilic | 470 |

Table II illustrates the practice of the invention wherein representative mixtures of acids and Wingstay-S (reaction products of 1 mol of phenol and 2 mols of styrene) were used to protect the rubber. Column 1 shows that the acids alone are good antioxidants when compared with the standards and column 2 shows that protection of the rubber is greatly improved when the indicated acids are mixed with Wingstay S, a well known commercial antioxidant.

TABLE II

| Acid (2%) | Hours to 0.5% Oxygen | (Combined with 1.25% Wingstay S) Hours to 0.5% Oxygen |
|---|---|---|
| None | 8 | |
| None | | 30 |
| Isocinchomeronic | 87 | 480 |
| Imidazole dicarboxylic | 30 | 295 |
| Acetoacetanilide | 12 | 90 |
| Tartaric | 70 | 500 |
| Isoascorbic | 78 | 650 |
| Cyclohexyldicarboxylic | 104 | 430 |
| Kojic | 500 | 500 |
| Kojyl palmitate | 100 | 650 |
| β-hydroxybutyric | 25 | 135 |
| Malonic | 285 | 650 |
| Thiodipropionic | 110 | 595 |
| Anthranilic | 470 | 630 |
| Citric | 68 | 135 |
| Oxalic | 67 | 500 |
| Thiomalic | 75 | 500 |

This chart shows effectiveness of acids alone (1st column) and synergistic effect when combined with Wingstay-S (2nd column).

Table III illustrates the practice of the invention wherein representative phenolic and amine antioxidants are combined with oxalic acid, a representative organic acid, to protect the rubber. Column one shows that each phenolic and each amine is a good antioxidant and Column two shows that the antioxidant protection is greatly improved when the amine or phenol is combined with oxalic acid.

TABLE III

| Antioxidant (1.25 pts.) | Hours to 0.5% Oxygen | (Combined with 2.0 parts oxalic acid) Hours to 0.5% Oxygen |
|---|---|---|
| None | 10 | |
| None | | 125 |
| R.P. of 1 mol of phenol + 2 mols of diisobutylene + 1 mol of isobutylene | 28 | 650 |
| R.P. of 1 mol of phenol + 2 mols of nonene +1 mol of isobutylene | 32 | 800 |
| R.P. of 1 mol of p-cresol + 1 mol of allylchloride + 1 mol of isobutylene | 46 | 800 |
| R.P. of 1 mol of phenol + 2 mols of styrene | 20 | 500 |
| Mixture of alkylated diaryl-p-phenylene diamines | 260 | 400 |
| Phenyl beta naphthylamine | 160 | 800 |

This chart shows improvement in performance of various antioxidants brought about by addition of oxalic acid.

Table IV illustrates the practice of the invention wherein a representative organic acid, tartaric acid, is mixed with a phenolic antioxidant in various rubbers.

TABLE IV

| Rubber | Commercial Mix of Alkylated Phenols (1.25 parts) Hours to 0.5% Oxygen | (Combined with tartaric acid—1 part) Hours to 0.5% Oxygen |
|---|---|---|
| SBR [1] (hot) | 80 | 500 |
| SBR oil extended 25 parts | 30 | 295 |
| SBR oil extended 37.5 parts | 17 | 240 |

[1] Containing about 25% by weight of styrene and 75% by weight of butadiene.

This chart shows that the synergistic effect of tartaric acid with a commercial phenolic antioxidant is exhibited in various types of SBR.

The practice of the invention is further illustrated by Table V wherein a commercial antioxidant, Wingstay S (R.P. of 1 mol of phenol +2 mols of styrene), is combined with various organic acids as antioxidants for rubber.

TABLE V

| Acid (2 parts) + Wingstay-S (1.25 parts): | Hours to 0.5% oxygen |
|---|---|
| None | 70 |
| Aconitic | 150 |
| P-aminobenzoic | 250 |
| β-Hydroxybutyric | 145 |
| Tartaric | 300 |
| Citrazinic | 160 |
| Anthranilic | 400 |
| Kojic | 400 |
| Kojyl palmitate | 400 |
| Citric | 400 |
| d-Camphoric | 175 |
| Tertiary butyl benzoic | 140 |
| Cis-4-cyclohexene-1,2-dicarboxylic | 210 |
| O-aminobenzene sulfonic acid | 105 |
| O-benzoyl benzoic acid | 108 |
| Amylene succinic anhydride | 145 |
| Benzoyl acetone | 320 |
| Diglycolic | 150 |
| 3,5-dinitrobenzoic | 115 |
| Chlorokojic | 235 |
| Cyclohexane-1,2-dicarboxylic | 160 |
| N-(p-hydroxyphenyl)glycine | 105 |
| p-Hydroxybenzoic | 105 |
| Isosebacic | 130 |
| Dehydroacetic | 250 |
| Pinic | 265 |
| Thiomalic | 400 |
| Dichloroacrylic | 105 |
| O-methoxybenzoic | 100 |
| dl-Mandelic | 240 |
| Isoascorbic | 265 |
| Malonic | 400 |
| Maleic anhydride | 185 |
| 1-naphthalene acetic acid | 110 |
| p-Nitrobenzoic | 160 |
| Nicotinic | 280 |

The invention is illustrated by Table VI wherein the phenolic antioxidant of Table V was substituted with the one shown.

TABLE VI

| Acid (1 part)+(R.P. of 1 mol of phenol+2 mols of diisobutylene +1 mol of isobutylene): | Hours to 0.5% oxygen |
|---|---|
| No acid | 45 |
| Picric | 95 |
| p-Nitrobenzoic | 230 |
| Pyruvic | 165 |
| m-Nitrobenzoic | 120 |
| Tannic | 205 |
| Tetrachlorophthalic anhydride | 150 |
| Thioglycolic | 260 |
| Tartaric | 420 |
| 1-amino-2-naphthol-4-sulfonic | 122 |
| 8-amino-1-naphthalenesulfonic | 460 |
| 5,5-methylenedisalicylic | 315 |
| O-(carboxymethoxy) benzoic acid | 135 |
| Cyanoacetic | 175 |
| Glutaric anhydride | 365 |
| p-Chloromandelic | 425 |
| 4-chloro-1-hydroxy-2-naphthoic acid | 500 |
| 7-chloro-4-hydroxy-3-quinoline carboxylic acid | 500 |
| Barbituric | 165 |
| β-Alanine | 400 |
| Benzilic | 500 |

Various oxidizable synthetic rubbers can be protected by the methods of this invention including, for example, copolymers containing a major proportion of a monoolefin, such as isobutylene, and a minor proportion of a conjugated diene, such as butadiene, isoprene, pentadiene-1,3 or dimethylbutadiene, etc., e.g. butyl rubber; rubbery copolymers of conjugated dienes, such as those already mentioned, and vinyl aromatic monomers such as styrene, α-methyl styrene, styrene derivatives containing from 1 to 3 alkyl groups of 1 to 4 carbon atoms each on the aromatic ring, vinyl naphthalene, etc., e.g. the copolymers of butadiene and styrene known as SBR, which contain about 25% by weight of styrene and about 75% by weight of butadiene; and polymers of conjugated dienes such as polyisoprene, polybutadiene, etc.

The customary dewatering, squeezing and drying apparatus referred to herein is described in Synthetic Rubber by Whitby, page 202.

While certain representative embodiments and details have been shown for the purpose of illustrating the invention, it will be apparent to those skilled in this art that various changes and modifications may be made therein without departing from the spirit or scope of the invention.

I claim:

1. A method of protecting unvulcanized diene synthetic rubber comprising adding an antioxidant amount of an organic acid selected from the group consisting of kojic, kojyl palmitate, isocinchomeronic, imidazoledicarboxylic, acetoacetanilide, β-hydroxybutyric, isoascorbic, cyclohexyldicarboxylic, tartaric, malonic, oxalic, and anthranilic to said rubber prior to drying.

2. A method of protecting unvulcanized diene synthetic rubber latex comprising adding an antioxidant amount of a composition selected from the group consisting of an organic acid selected from the group consisting of kojic, kojyl palmitate, isocinchomeronic, imidazoledicarboxylic, acetoacetanilide, β-hydroxybutyric, isoascorbic, cyclohexyldicarboxylic, tartaric, malonic, oxalic, and anthranilic to the synthetic rubber latex prior to coagulation and drying.

3. A method of protecting unvulcanized diene synthetic rubber comprising adding an antioxidant amount of an organic acid selected from the group consisting of kojic, kojyl palmitate, isocinchomeronic, imidazoledicarboxylic, acetoacetanilide, β-hydroxybutyric, isoascorbic, cyclohexyldicarboxylic, tartaric, malonic, oxalic, and anthranilic to said rubber prior to drying by spraying an organic acid onto partially dewatered crumbs of coagulated synthetic rubber.

4. The method according to claim 3 wherein the antioxidant is a synergistic mixture of an organic acid and an antioxidant selected from the group consisting of amine antioxidants and phenolic antioxidants.

5. A method of protecting unvulcanized diene synthetic rubber comprising adding an antioxidant amount of an organic acid selected from the group consisting of kojic, kojyl palmitate, isocinchomeronic, imidazoledicarboxylic, acetoacetanilide, β-hydroxybutyric, isoascorbic, cyclohexyldicarboxylic, tartaric, malonic, oxalic, and anthronilic to said rubber prior to drying by dipping partially dried crumbs of the synthetic rubber in a fluidized organic acid.

6. The method according to claim 5 wherein the antioxidant is a synergistic mixture of an organic acid in an antioxidant amount and an antioxidant selected from the group consisting of amine antioxidants and phenolic antioxidants.

7. A method of protecting unvulcanized diene synthetic rubber comprising adding an antioxidant amount of an organic acid to said rubber prior to coagulation and drying by mixing an organic acid selected from the group consisting of kojic, kojyl palmitate, isocinchomeronic, imidazoledicarboxylic, acetoacetanilide, β-hydroxybutyric, isoascorbic, cyclohexyldicarboxylic, tartaric, malonic, oxalic, and anthranilic with an uncoagulated synthetic rubber latex and thereafter coagulating and drying the synthetic rubber.

8. A method of protecting unvulcanized diene synthetic rubber comprising adding an antioxidant amount of an organic acid selected from the group consisting of kojic, kojyl palmitate, isocinchomeronic, imidazoledicarboxylic, acetoacetanilide, β-hydroxybutyric, isoascorbic, cyclohexyldicarboxylic, tartaric, malonic, oxalic, and anthranilic to the polymerization system from which said rubber is prepared, polymerizing the mixture in the customary manner, coagulating the resulting latex and drying the synthetic rubber.

9. The method according to claim 8 wherein the antioxidant is a synergistic mixture of an organic acid with phenolic or amine antioxidant.

10. A method of protecting unvulcanized diene synthetic rubber comprising adding to said rubber an antioxidant amount of a synergistic mixture composed of an organic acid selected from the group consisting of kojic, kojyl palmitate, isocinchomeronic, imidazoledicarboxylic, acetoacetanilide, β-hydroxybutyric, isoascorbic, cyclohexyldicarboxylic, tartaric, malonic, oxalic, and anthranilic, and an antioxidant selected from the group consisting of amine antioxidants and phenolic antioxidants, said synergistic mixture being added to the rubber prior to coagulation and drying by adding the synergistic mixture with an uncoagulated synthetic rubber latex and thereafter coagulating and drying the synthetic rubber.

11. A method of protecting unvulcanized diene synthetic rubber comprising adding an antioxidant amount of tartaric acid to said rubber prior to drying.

12. A method of protecting unvulcanized diene synthetic rubber comprising adding an antioxidant amount of oxalic acid to said rubber prior to drying.

13. A method of protecting unvulcanized diene synthetic rubber latex comprising adding an antioxidant amount of tartaric acid to the synthetic rubber latex prior to coagulation and drying.

14. A method of protecting unvulcanized diene synthetic rubber comprising adding an antioxidant amount of tartaric acid to said rubber prior to drying by spraying said tartaric acid onto partially dewatered crumbs of coagulated synthetic rubber.

15. A method of protecting unvulcanized diene synthetic rubber comprising adding to said rubber an antioxidant amount of a synergistic mixture composed of tartaric acid and an antioxidant selected from the group consisting of amine antioxidants and phenolic antioxidants, said synergistic mixture being added to the rubber prior to coagulation and drying by adding the synergistic mixture to uncoagulated synthetic rubber latex and thereafter coagulating and drying the synthetic rubber.

References Cited in the file of this patent

UNITED STATES PATENTS

| | | |
|---|---|---|
| 2,570,632 | Barton | Oct. 9, 1951 |
| 2,581,924 | Smith et al. | Jan. 8, 1952 |
| 2,669,507 | Young | Feb. 16, 1954 |
| 2,765,292 | Groff et al. | Oct. 2, 1956 |

OTHER REFERENCES

Sauser: Abstract of abandoned application 586,279, published October 3, 1950.